United States Patent [19]

Shimazaki

[11] 4,392,198
[45] Jul. 5, 1983

[54] METHOD OF PRODUCING MICROADDRESSES AND A COMPUTER SYSTEM FOR ACHIEVING THE METHOD

[75] Inventor: Shigeo Shimazaki, Kanagawa, Japan

[73] Assignee: Matsushita Electric Industrial Company, Limited, Osaka, Japan

[21] Appl. No.: 169,472

[22] Filed: Jul. 16, 1980

[30] Foreign Application Priority Data

Jul. 18, 1979 [JP] Japan ................................. 54-91334

[51] Int. Cl.³ .............................................. G06F 9/32
[52] U.S. Cl. .................................... 364/200; 307/465
[58] Field of Search ... 307/465; 364/716, 200 MS File, 364/900 MS File; 340/166 R, 825.83, 825.87

[56] References Cited

U.S. PATENT DOCUMENTS

| | | | |
|---|---|---|---|
| 3,949,370 | 4/1976 | Reyling, Jr. et al. | 364/900 |
| 3,974,366 | 8/1976 | Hebenstreit | 364/716 |
| 3,991,404 | 11/1976 | Brioschi et al. | 364/200 |
| 3,993,981 | 11/1976 | Cassarino, Jr. et al. | 364/200 |
| 4,003,033 | 1/1977 | O'Keefe et al. | 364/200 |
| 4,034,356 | 7/1977 | Howley | 307/465 |
| 4,037,089 | 7/1977 | Horninger | 364/716 |
| 4,237,542 | 12/1980 | Cukier | 364/716 X |

OTHER PUBLICATIONS

McKinney et al., "PLA With Provision for Interrupts", IBM Tech. Disc. Bulletin, vol. 20, No. 2, 7/1977, pp. 745-746.

Hicks, "Sequence Controller Using PLA", IBM Tech. Disc. Bulletin, vol. 20, No. 2, 7/1977, pp. 743-744.

Primary Examiner—Raulfe B. Zache
Assistant Examiner—David Y. Eng
Attorney, Agent, or Firm—Lowe, King, Price & Becker

[57] ABSTRACT

A central processing unit of a computer system comprises a programmable logic array which is constructed of an AND matrix and an OR matrix. The AND matrix is responsive to a machine language instruction and to a number of a region for selecting one row from a plurality of rows arranged in the AND matrix. The OR matrix, which also has a plurality of rows, is responsive to the selected row for selecting one row therefrom. In each of the rows of the OR matrix a microaddress and a number of a region to be used for producing a subsequent microaddress are prewritten so that information on a microaddress and information on a region number are respectively obtained. At least one microinstruction included in a microprogram will be read out from a read-only memory in accordance with the obtained microaddress to execute the same, while a microaddress of a subsequent microprogram is produced in the programmable logic array. Namely the execution of a microprogram routine and the production of the first address of a following microprogram routine are concurrently performed so that efficient execution of microprograms can be achieved, while each microinstruction is not required to include region number information.

4 Claims, 7 Drawing Figures

| INSTRUCTIONS \ BLOCK NO. | "0" | "1" | "2" | "3" |
|---|---|---|---|---|
| (1) | A |  | F |  |
| (2) | B | D |  | G |
| (3) | C |  |  |  |
| (4) | B | D |  | H |
| (5) | E |  | H |  |

METHOD OF PRODUCING MICROADDRESSES AND A COMPUTER SYSTEM FOR ACHIEVING THE METHOD

FIELD OF THE INVENTION

This invention generally relates to a method and apparatus for producing a microaddress by the first address in a microprogram routine for the execution of a machine language instruction in a computer controlled by a microprogram.

BACKGROUND OF THE INVENTION

In a computer controlled by a microprogram, the following three processes are repeatedly performed one after another:
(1) fetching a machine language instruction from a main memory;
(2) producing a first address in a microprogram routine in accordance with the machine language instruction; and
(3) executing the microprogram routine. However, it is necessary to execute many microprogram routines if the machine language instructions are complicated and have a sophisticated function so that it is required to employ a complex circuit and it also takes a lot of time for executing the above-mentioned process (2). Furthermore, it is necessary to produce many first addresses for many microprogram routines from a single machine language instruction.

Although there are a number of methods of producing a first address of a microprogram routine from a machine language instruction, a programmable logic array, referred to as PLA hereinafter, is often and normally used in which first addresses of microprogram routines are made to correspond to the bit pattern of a machine language instruction. In case of producing a plurality of first addresses of microprogram routines with respect to one machine language instruction a method of dividing the PLA into a plurality of regions, and giving information, which designates a region, from a specific field of a microinstruction is commonly adopted.

However, such a method has the following drawbacks: Namely, the type and the function of a machine language instruction influences on the type of microinstructions, and it is impossible to obtain a first address of a microprogram routine to be executed next as long as a microinstruction having information on the designation of a region has not been executed.

SUMMARY OF THE INVENTION

The present invention has been developed in order to remove the above-mentioned drawbacks inherent to the conventional method.

It is, therefore, a primary object of the present invention to provide a method and apparatus for producing first addresses of microprogram routines with respect to a single machine language instruction by executing the above-mentioned processes (2) and (3) concurrently.

Another object of the present invention is to provide a method and apparatus for producing first addresses of microprogram routines in which the type of the microinstructions is not influenced by the type and the function of the machine language instructions so that is is unnecessary to change the microinstructions when it is intended to change the machine language instructions.

In accordance with the present invention there is provided a method of microprogrammed producing microaddresses in a computer having a main memory and a central processing unit, which includes a first means for storing a plurality of microprograms, each including at least one microinstruction, a second means for producing a selection-control signal; and a third means for producing microaddresses of the microinstructions in accordance with a machine language instruction and with the selection-control signal, the third means having a plurality of regions each including a plurality of words each including information of a microaddress as well as information of the number of a block to be used next for producing a subsequent microaddress, the method comprising the steps of: (a) fetching a machine language instruction from the main memory; (b) initializing the selection-control signal; (c) selecting a microaddress from the third means in accordance with the combination of the machine language instruction and the selection-control signal which assumes an initial value, the microaddress being fed to the first means for reading out and executing a corresponding microinstruction; (d) simultaneously reading information on the number of a region to be used next from the third means to change the selection-control signal; (e) selecting a new microaddress from the third means in accordance with the combination of the machine language instruction and the changed selection-control signal, the newly produced microaddress being fed to the first means for reading out and executing a corresponding microinstruction; and (f) repeating the steps of (d) to (e) until the microaddresses of microprograms designated by the machine language instruction are produced.

In accordance with the present invention there is also provided a microprogrammed computer system comprising: (a) a main memory for storing a plurality of machine language instructions; (b) a bus access controller; (c) a machine language instruction register for storing a machine language instruction fetched from the main memory via the bus access controller; (d) a block-designate register for storing the number of a region to be used next; (e) a programmable logic array having a plurality of regions each having a plurality of words each including information on a microaddress and information on the number of a region to be used next for producing a subsequent microaddress, said programmable logic array being simultaneously responsive to both the output signal of the machine language instruction register and the output signal of the region-designate register, the programmable logic array having first output for delivering the information on a microaddress and a second output for delivering the information on the number of a region, the second output being connected to an input of the region-designate register; (f) a read-only memory address register, arranged to output its contents as they are and its contents plus one, for storing one of three data, a first datum among the three data being the information on a microaddress from the programmable logic array, and a second datum being a value which equals the value of the contents plus one; (g) read-only memory for storing a plurality of microprograms each including at least one microinstruction, one of the microprograms being read out in accordance with the output of the read-only memory address register; (h) a microinstruction register for storing a microinstruction read out from the read-only memory, the microinstruction register having first and second outputs, the first output being connected to the read-only memory address register for supplying the read-out memory address register with a specific field in the microinstruction as a third datum among the three data; (i) a decoder responsive to the microinstruction supplied from the second output of the microinstruction register for producing a plurality of control signals with which various elements in the computer system are controlled; and (j) an execution controller for controlling the execution of the microinstruction.

BRIEF DESCRIPTION OF THE DRAWINGS

These and other objects and features of the present invention will be more readily apparent from the following detailed description of the preferred embodiment taken in conjunction with the accompanying drawings in which.

DETAILED DESCRIPTION OF THE PREFERRED EMBODIMENT

Figure 1:
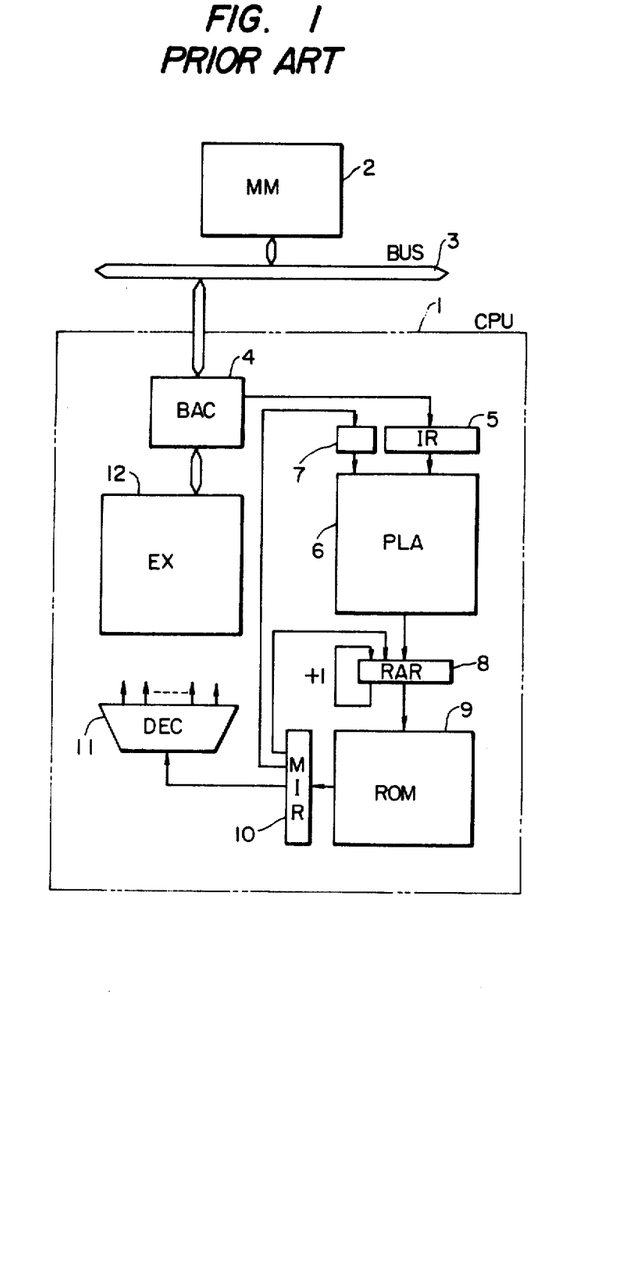
FIG. 1 is a diagram useful for understanding the conventional data processing method.

Prior to describing the embodiment of the present invention, a conventional method will be discussed first for a better understanding of the present invention. FIG. 1 illustrates one example of a conventional method in which a PLA (programmable logic array) is employed for producing first addresses of microprogram routines from a machine language instruction. In FIG. 1, a reference numeral 1 represents a central processing unit (CPU), 2 a main memory (MM), and 3 a data bus (BUS). In the CPU 1, a reference numeral 4 represents a bus access controller (BAC), 5 a machine language instruction register (IR), 6 a programmable logic array (PLA), 7 a region-designate register, 8 an address register (RAR) for a read-only memory, 9 a read only memory (ROM), 10 a microinstruction register (MIR), 11 a decoder (DEC) for microinstructions, and 12 an execution controller (EX). The aforementioned process (1) is achieved by reading out a machine language instruction from the main memory 2 by means of the bus access controller 4 and by installing the machine language instruction in the machine language register 5. The process (2) corresponds to the steps of installing the contents of the machine language instruction register 5 and the contents of the block-designate register 7, which designates a region in the PLA 6, producing by the PLA 6 first addresses of a microprogram corresponding to the machine language instruction which is loaded in the machine language register 5, and storing this information into the RAR 8. In the RAR 8, one of the following three data will be stored. The first datum is the output of the PLA 6, the second datum equals the contents of the RAR 8 plus 1, and the third data corresponds to a specific field of a part of a microinstruction fed from the microinstruction register 10. One of these three data is selected in accordance with a microinstruction to be applied to the RAR 8, and an applied datum will be stored therein. The PAR 8 comprises a register for storing address information, and an incrementer so that the PAR 8 always outputs the stored contents at its first output and values obtained by adding one to each value of the contents of its second output. In the process of producing first addresses of microprogram routines from a machine language instruction, the output of the PLA 6 is selected. The process (3) corresponds to the following steps. Namely, installing the contents of the ROM 9, corresponding to the address loaded in the RAR 8, in the microinstruction register 10, transforming the contents into control signals for respective portions by means of the decoder 11, and controlling the execution controller 12 with the same. The above is a brief description of the operation of the system of FIG. 1, and in FIG. 1, region-designate information for the PLA 6 is supplied from the microinstruction register 10. Accordingly, in the process of producing addresses of microprograms from a machine language instruction, information passes through a route expressed in terms of 10→7→6→8→9→10. The information path in normal microcycles is expressed in terms of 10→8→9→10, and therefore, the above-mentioned route or process is longer than that of normal cycles. Such a long process often cannot be completed with one cycle. In accordance with the present invention region-designate information is supplied from the PLA 6 to reduce the length of the information path or route so as to actualize a method of producing first addresses of microroutines at a high-speed.

Figure 2:
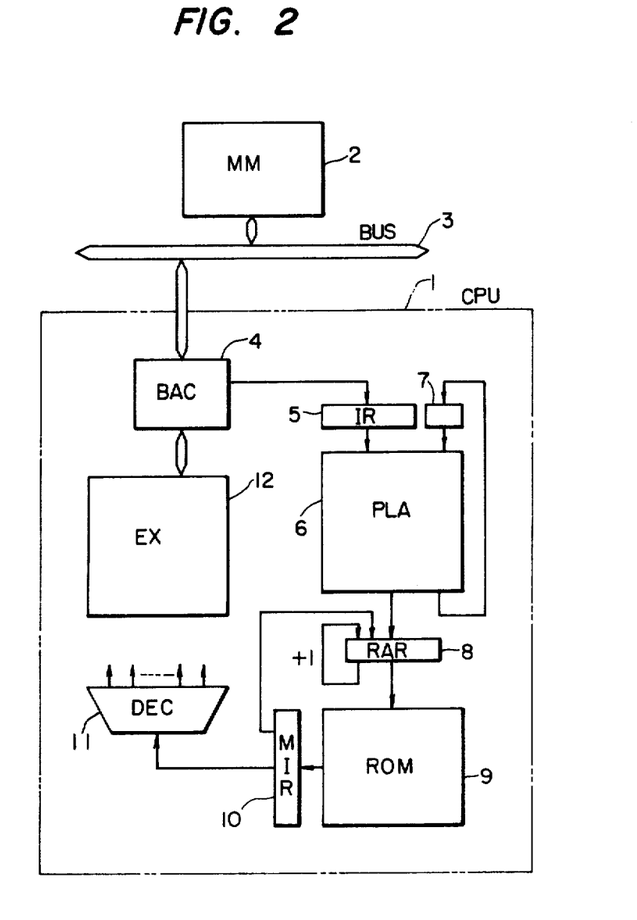
FIG. 2 is a diagram useful for understanding an embodiment of the data processing method according to the present invention.

FIG. 2 illustrates an example of a device for producing a first address of a microprogram from a machine language instruction in accordance with the method of the present invention. In FIG. 2, elements, except for the PLA 6, designated at the same reference numerals as in FIG. 1 respectively have the same function as those in FIG. 1. The PLA 6 in FIG. 2 receives the outputs of the instruction register 5 and the outputs of the region-designate register 7 for producing and delivering microaddresses corresponding to the inputs thereof, and the number of a region which will be used for producing a microaddress of a microprogram to be executed subsequently. The region number delivered from the PLA 6 is fed to the region-designate register 7.

Thus, although conventionally, information from the machine language instruction register 5 and information supplied from a specific field of a microinstruction are both input to the PLA 6, according to the present invention, information from the machine language instruction register 5 and feedback information from the PLA 6 are both input to the PLA 6 and, therefore, microaddress and feedback information are output from the PLA 6 in accordance with the combination of these pieces of information both fed to the PLA 6. As a result, the information path in the aforementioned process (2) for producing an address of a microprogram becomes 7→6→8, while the information path in the process of reading out a microinstruction corresponding to a microaddress from the ROM 9 in the aforementioned process (3) becomes 8→9→10→8. Namely, the former and latter information paths are independent from each other so that the above-mentioned processes (2) and (3) may be executed concurrently, and thus these processes may be carried out with a single cycle in the same manner as the aforementioned normal cycle. In addition, since region number information is not needed in the microinstructions, the length of a microinstruction may be shortened. Furthermore, from the above two reasons microinstructions do not depend on machine language instructions. The method having such a feature according to the present invention will be described with reference to an embodiment of the PLA 6 hereinafter.

Figure 3:
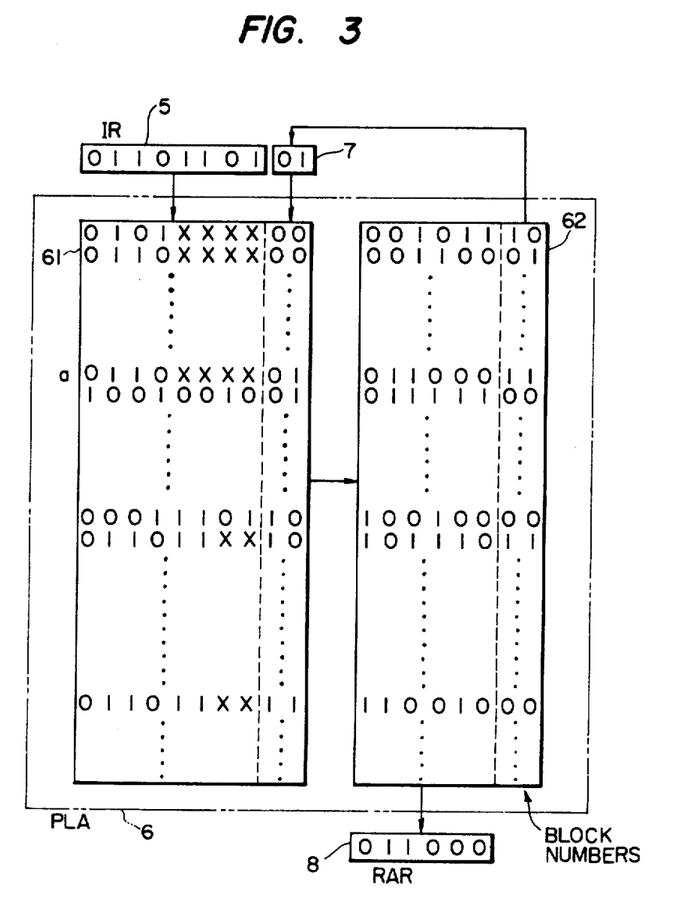
FIG. 3 is a detailed diagram for the description of a part of the diagram of FIG. 2.

Hence, reference is now made to FIG. 3 which is a detailed view of the elements 5, 6, 7 and 8 in FIG. 2. In FIG. 3, the PLA 6 is constructed of an AND matrix 61 and an OR matrix 62, where a machine language instruction and a block number are applied to the AND matrix 61, and then the OR matrix 62 delivers a microaddress and a block number each corresponding to the inputs. In the AND matrix 61, a bit pattern and region numbers corresponding to respective machine language instructions are prewritten in respective rows arranged therein, while in each of rows arranged in the OR matrix 62, a microaddress corresponding to each row in the AND matrix 61 and a number of a region, which will be used for producing a next microaddress, are prewritten. The PLA 6 compares the contents of the inputs with the contents of each row of the AND matrix 61 to select only one row whose bit pattern equals the bit pattern of the combination of the machine language instruction and the region number, so that the contents of the same row in the OR matrix 62 will be delivered. For instance, in case of feeding the AND matrix 61 with "01101101" as a machine language instruction, and "01" as a block number, a row designated at "a" is active so that "011000" as a microaddress, and "11" as a region number are delivered from the OR matrix 62. These two kinds of information are respectively supplied from two outputs of the PLA 6 to the RAR 8 and to the block-designate register 7 as shown in FIG. 2. It will be seen in FIG. 2 that a circuit is provided to connect one of these outputs of the PLA 6 to the input of the region-designate register 7. References X in the AND matrix 61 indicate that the bits thereof are not compared.

Now the difference between the conventional method and the method according to the present invention will be described by way of an example.

Figure 4:
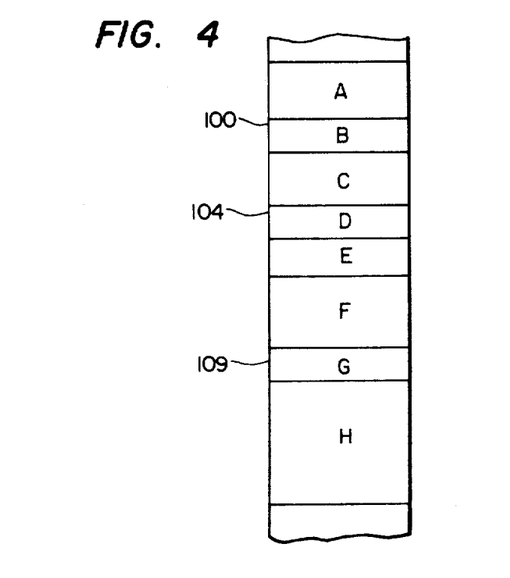
FIG. 4 is a view showing the location of the program in the read-only memory shown in FIG. 2.
Figure 5:
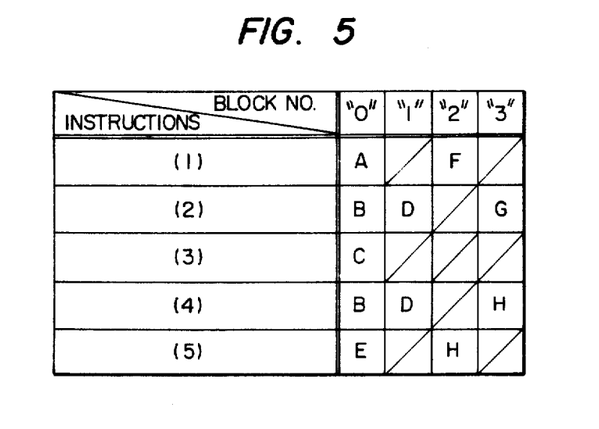
FIG. 5 is a table giving definitions of various machine language instructions.

Let us assume that the ROM 9 of FIG. 2 is provided with microprograms of different kinds A to H as shown in FIG. 4, and that there are five instructions as the machine language instructions as shown in FIG. 5. FIG. 5 illustrates the kinds and sequence of microprograms to be executed in accordance with respective machine language instructions, and the number of a region to be applied to the PLA 6 for obtaining the first address of the microprogram to be executed. Namely, a machine language instruction (1) means the execution of microprograms A and F, while a machine language instruction (2) means the execution of microprograms B, D and G in the mentioned order. Accordingly, the first addresses of the microprograms with respect to the machine language instruction (1) will be obtained if the region numbers to be applied to the PLA 6 are respectively set to "0" and "2". In the same manner, the first addresses of the microprograms with respect to the machine language instruction (2) will be obtained if the region numbers are respectively set to "0," "1" and "3". As is well known, each of the microprograms A to H comprises at least one microinstruction.

Figure 6:
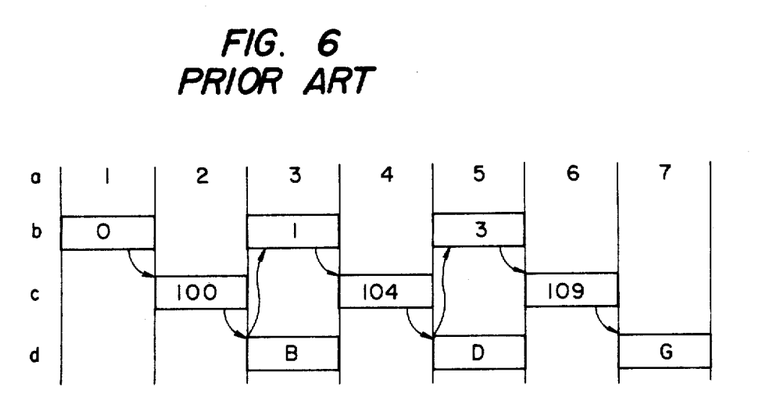
FIGS. 6 and 7 are timing charts useful for understanding the operation of the system illustrated in FIG. 1 and FIG. 2.
Figure 7:
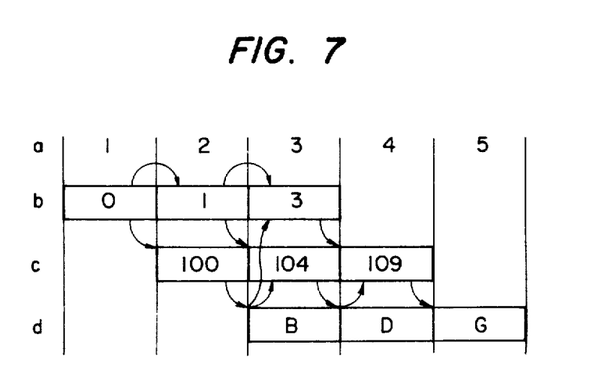

The actual operation in the system of FIG. 1 and FIG. 2 will be described hereinbelow by way of an example in which the machine language instruction (2) is executed, with reference to timing charts of FIG. 6 and FIG. 7. Let us assume that each of the microprograms B, D and G comprises a single step or microinstruction for simplicity. FIG. 6 is a timing chart showing the operation performed by the system of the conventional method of FIG. 1. In the timing chart, a column designated at "a" indicates the number of microcycles. A column "b" indicates the operation of the PLA 6, and each of the numbers in squares respectively indicates the number of the region in its operation. A column "c" indicates the readout from the ROM 9, while each of the numerals indicates the contents of the RAR 8. A column "d" indicates the execution of a microprogram, while each of the symbols in the squares indicates the kind of the microprogram to be executed. FIG. 7 is a timing chart showing the execution performed by the system of FIG. 2 according to the present method, and references "a", "b", "c" and "d" in the timing chart respectively correspond to those in FIG. 6.

Firstly, the operation performed by the system of FIG. 1 according to the conventional method will be described with reference to FIG. 6. It is assumed that the contents of the block-designate register 7 is equal to "0" as an initial value. The microprograms corresponding to the machine language instruction (2) are B, D and G as shown in FIG. 5. In addition, the addresses of the programs are respectively "100", "104" and "109" as shown in FIG. 4. In a first cycle, an address of "100" of the microprogram B is produced in the PLA 6. The produced address is installed in the RAR 8 in a second cycle to perform the readout from the ROM 9. In a third cycle, the microinstruction register 10 is loaded with a corresponding microinstruction read out from the ROM 9 for executing the microprogram B. Since a number "1" of the block, which is necessary for producing an address of a microprogram D to be executed next, it supplied from the microinstruction, this information is stored in the block-designate register 7, and then the production of the address "104" of the microprogram D is also done in this cycle. In a fourth cycle, the output of the PLA 6, i.e. "104" is installed in the RAR 8 to effect the readout from ROM 9. In a fifth cycle, in the same manner as in the third cycle, the execution of the microprogram read out from the ROM 9 and the production of the address "109" of the microprogram G to be executed next are performed. A block number of "3" is supplied from the microinstruction. The produced address "109" is installed in the RAR 8 in a sixth cycle, then performing the readout from the ROM 9, and installing the read out microinstruction in the microinstruction register 10 in a seventh cycle to execute the same. As described in the above, the execution of the machine language instruction (2) is completed with seven cycles.

With reference to FIG. 7 the operation of the system of FIG. 2 according to the method of the present invention will be described. Let us assume that the contents of the region-designate register 7 have been set to "0" as an initial value. In the machine language instruction register 5, is stored a machine language instruction (2) in advance. In a first cycle, the PLA 6 produces a microaddress of "100" corresponding to the microprogram B as well as the number of the region which is necessary for producing the address of "104" of the microprogram D to be executed after the microprogram B. In a second cycle, the produced two kinds of information are respectively installed in the RAR 8 and the region-designate register 7 to perform the readout from the ROM 9 and to produce an address of the microprogram D. In a third cycle, the microinstruction read out from the ROM 9 is stored in the microinstruction register 10 to execute the microprogram B. Furthermore, in the third cycle, the output of the PLA 6 is stored in the RAR 8 and in the region-designate register 7 in accordance with the microinstruction in order to effect the readout from the ROM 9 and the production of the address "109" of the microprogram G simultaneously. In a fourth cycle, the execution of the microprogram D read out from the ROM 9, the installation of the address "109" of the microprogram G, which address is the output of the PLA 6, and the readout from the ROM 9 are carried out. The read out microinstruction, namely, the microprogram G is executed in a following fifth cycle to complete the execution of the machine language instruction (2).

As will be understood from FIG. 6 and FIG. 7, in accordance with the conventional method since region information which is necessary for producing a subsequent microaddress is supplied from a microinstruction, such a microinstruction must be executed to obtain such region information. However, it is to be noted that region information which is necessary for producing a first address of a microprogram to be executed secondly will be determined if the kind, namely, the first address, of the microprogram executed first is obtained as will be understood from FIG. 5. Namely, speaking in connection with the machine language (2), the number "1" of the block, which is necessary for producing the first address of the microprogram D is determined if it is ascertained that the microprogram to be executed first is B. In other words, the number of the region is determined if the address of the microprogram B is recognized. Consequently, in accordance with the present invention remarkably efficient execution can be actualized by simultaneously producing by the PLA 6 the address of the microprogram B and the region information necessary for producing the address of the microprogram D to be executed subsequently to the microprogram B.

From the foregoing, it will be understood that effective concurrent processing can be actualized by adopting the method according to the present invention. According to the method since region number information is not included in microinstructions, the change of the microinstructions is not required even though it is intended to alter the machine language instructions. For this reason the type of microinstructions is not influenced by the type and the function of the machine language instructions.

What is claimed is:

1. A method of producing microaddresses in a microprogrammed computer having a main memory and central processing unit, which computer includes a first means for storing a plurality of microprograms each including at least one microinstruction, a second means for producing a selection control signal; and a third means for producing microaddresses of said microprograms in accordance with a machine language instruction and with said selection-control signal, said third means having a plurality of regions each including a plurality of words each including a microaddress as well as the number of a region to be used next for producing a subsequent microaddress, said method comprising the steps of:

(a) fetching a machine language instruction from said main memory;

(b) initializing said selection-control signal;

(c) selecting a microaddress from said third means in accordance with the combination of said machine language instruction and said selection control signal which assumes an initial value, said microaddress being fed to said first means for reading out and executing a corresponding microprogram;

(d) simultaneously with step (c) reading information on the number of a region to be used next from said third means to change said selection-control signal;

(e) selecting a new microaddress from said third means in accordance with the combination of said machine language instruction and the changed selection control signal, said newly produced microaddress being fed to said first means for reading out and executing a corresponding microprogram; and (f) repeating said steps of (d) to (e) until the microaddresses of microprograms designated by said machine language instruction are produced.

2. A method of producing a microaddress as claimed in claim 1, wherein each of said steps of selecting a microaddress comprises the steps of:

(a) comparing the combination of said machine language instruction and said selection-control signal with a plurality of bit patterns prestored in respective rows arranged in an AND matrix of a programmable logic array for selecting one row; and (b) selecting one row from a plurality of rows arranged in an OR matrix of said programmable logic array in accordance with said selected row from said AND matrix, each of said rows in said OR matrix being preloaded with a microaddress and the number of a region to be used next for producing a subsequent microaddress, so that a desired microaddress of a microprogram to be executed is obtained in response to a specific combination of said machine language instruction and said selection control signal both fed to said AND matrix.

3. A microprogrammed computer system comprising:

(a) a main memory for storing a plurality of machine language instructions;

(b) a bus access controller;

(c) a machine language instruction register for storing a machine language instruction fetched from said main memory via said bus access controller;

(d) a region-designate register for storing the number of a region to be used next;

(e) a programmable logic array having a plurality of regions each having a plurality of words each including information on a microaddress and information on the number of a region to be used next for producing a subsequent microaddress, said programmable logic array being simultaneously responsive to both the output signal of said machine language instruction register and the output signal of said region-designate register, said programmable logic array having a first output for delivering said information on a microaddress and a second output for delivering said information on the number of a region, said second output being connected to an input of said region-designate register;

(f) a read-only memory address register, arranged to output its contents as they are and its contents incremented by one, for storing one of three data, a first datum among said three data being said information on a microaddress from said programmable logic array, and a second datum being a value which equals the incremented value of the contents;

(g) a read-only memory for storing a plurality of microprograms each including at least one microinstruction, one of said microprograms being read out in accordance with the output of said read-only memory address register;

(h) a microinstruction register for storing a microinstruction read out from said read-only memory, said microinstruction register having first and second outputs, said first output being connected to said read-only memory address register for supplying said read-only memory address register with a specific field in said microinstruction as a third datum among said three data;

(i) a decoder responsive to said microinstruction supplied from said second output of said microinstruction register for producing a plurality of control signals with which various elements in said computer system are controlled; and (j) an execution controller for controlling the execution of said microinstruction.

4. A microprogrammed computer system as claimed in claim 3, wherein said programmable logic array comprises:

(a) an AND matrix responsive to the combination of said machine language instruction and said number of a region from said region-designate register, a plurality of bit patterns corresponding to various combinations of said machine language instructions and the numbers of regions being prewritten in respective rows arranged in said AND matrix, so that one row corresponding to an input combination will be selected; and (b) an OR matrix responsive to a selected row from said AND matrix for producing said information on a microaddress and said information on the number of a region to be used next, a plurality of microaddresses and a plurality of numbers of regions being prewritten in respective rows, which correspond to said respective row in said AND matrix, arranged in said OR matrix.

* * * * *